US011121636B2

(12) United States Patent
Schmidt et al.

(10) Patent No.: US 11,121,636 B2
(45) Date of Patent: Sep. 14, 2021

(54) SYSTEM INCLUDING A FIRST INVERTER AND A SECOND INVERTER, AND METHOD FOR OPERATING THE SYSTEM

(71) Applicant: SEW-EURODRIVE GMBH & CO. KG, Bruchsal (DE)

(72) Inventors: Josef Schmidt, Graben-Neudorf (DE); Thomas Zöller, Bruchsal (DE); Jens Schäfer, Graben-Neudorf (DE); Matthias Hauck, Schwetzingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 27 days.

(21) Appl. No.: 16/335,799

(22) PCT Filed: Jul. 20, 2017

(86) PCT No.: PCT/EP2017/025218
§ 371 (c)(1),
(2) Date: Mar. 22, 2019

(87) PCT Pub. No.: WO2018/054544
PCT Pub. Date: Mar. 29, 2018

(65) Prior Publication Data
US 2019/0214919 A1     Jul. 11, 2019

(30) Foreign Application Priority Data
Sep. 22, 2016    (DE) .................... 10 2016 011 426.6

(51) Int. Cl.
*H02M 7/493*     (2007.01)
*H02M 5/458*     (2006.01)
(Continued)

(52) U.S. Cl.
CPC ............. *H02M 5/4585* (2013.01); *H02J 1/16* (2013.01); *H02M 5/458* (2013.01); *H02P 5/74* (2013.01); *H02M 1/008* (2021.05); *H02P 27/06* (2013.01)

(58) Field of Classification Search
CPC ........ H02P 27/06; H02P 5/74; H02M 5/4585; H02M 2001/008; H02M 7/493
See application file for complete search history.

(56) References Cited

U.S. PATENT DOCUMENTS 7,752,878 B2   7/2010   Schmeink
9,831,805 B2   11/2017   Bian
(Continued)

FOREIGN PATENT DOCUMENTS

DE         10150347 A1    4/2003
DE    102006033562 B3    2/2008
(Continued)

OTHER PUBLICATIONS

International Search Report dated Oct. 6, 2017, in International Application No. PCT/EP2017/025218 (English-language translation).

(Continued)

*Primary Examiner* — Cortez M Cook
(74) *Attorney, Agent, or Firm* — Carter DeLuca & Farrell LLP

(57) ABSTRACT

In a system and method for operating a system, which includes a first inverter which feeds a first electric motor, and a second inverter which feeds a second electric motor, the DC-voltage side connection of the first inverter is connected to the DC-voltage side connection of a rectifier which is supplied from an electrical AC-voltage supply network, the DC-voltage side connection of the second inverter is connected to the DC-voltage side connection of the rectifier, in (Continued)

particular, the two DC-voltage side connections of the inverters are switched in parallel, and a controller is provided, in particular in the first inverter, which controls the current accepted and acquired by the first inverter at its DC-voltage side terminal toward a setpoint value in that the torque of the first electric motor fed by the first inverter is the controlled variable.

16 Claims, 3 Drawing Sheets

(51) Int. Cl.
*H02P 5/74* (2006.01)
*H02J 1/16* (2006.01)
*H02P 27/06* (2006.01)
*H02M 1/00* (2006.01)

(56) References Cited

U.S. PATENT DOCUMENTS

| | | | | |
|---|---|---|---|---|
| 2013/0106328 | A1* | 5/2013 | Kopiness | H02M 1/36 318/400.11 |
| 2014/0064986 | A1* | 3/2014 | Mirzaei | F04B 35/002 417/44.11 |
| 2014/0198475 | A1 | 7/2014 | Menzies et al. | |
| 2014/0361613 | A1* | 12/2014 | Huang | H02M 7/493 307/12 |

FOREIGN PATENT DOCUMENTS

| | | |
|---|---|---|
| DE | 102010023536 A1 | 12/2011 |
| DE | 102011003572 A1 | 8/2012 |
| DE | 102012212946 A1 | 2/2014 |
| EP | 2112014 A1 | 10/2009 |
| EP | 2525481 A1 | 11/2012 |
| EP | 2811633 A2 | 12/2014 |
| JP | 2002051589 A | 2/2002 |
| JP | 2007318981 | 12/2007 |
| JP | 2015133843 A | 7/2015 |
| WO | 2016/127650 A1 | 8/2016 |

OTHER PUBLICATIONS

European Office Action issued in corresponding European Application No. EP17745260.4, dated Sep. 4, 2020, pp. 1-5.
International Preliminary Report on Patentability issued in International Patent Application No. PCT/EP2017/025218, dated Apr. 4, 2109(7 pages).

* cited by examiner

SYSTEM INCLUDING A FIRST INVERTER AND A SECOND INVERTER, AND METHOD FOR OPERATING THE SYSTEM

FIELD OF THE INVENTION

The present invention relates to a system, which includes a first inverter and a second inverter, and to a method for operating the system.

BACKGROUND INFORMATION

An inverter feeds an electric motor and can be supplied by a rectifier at its DC-voltage side connection.

German Patent Document No. 10 2006 033 562 describes a servo press including an energy management.

German Patent Document No. 10 2010 023 536 describes a device and a method for an intelligent drive-based network power control with the aid of a kinetic energy storage.

European Patent Document No. 2 525 481 describes a control device for an indirect converter as well as an indirect converter itself.

German Patent Document No. 101 50 347 describes a heavy fan for three-phase motors in passenger transportation systems.

SUMMARY

Example embodiments of the present invention provide a system in which the lowest possible power withdrawal from an AC-voltage supply network is to be required.

According to an example embodiment of the present invention, a system includes a rectifier which is able to be supplied from an electrical AC-voltage supply network, a first inverter which feeds a first electric motor, and a second inverter which feeds a second electric motor. The DC-voltage side connections of the first and the second inverter are connected to the DC-voltage side connection of the rectifier in each case, and a current acquisition device is situated inside the housing of the first inverter. Either the current acquisition device is adapted to acquire the current emerging from the rectifier at the DC-voltage side connection of the rectifier, or the current acquisition device is adapted to acquire the currents entering from the electrical AC-voltage supply network at the AC-voltage side connection of the rectifier. A supply of the network-side three-phase current is possible on the housing of the first inverter, which is conveyed to the current acquisition device and is routed out of the housing of the first inverter to the housing of the rectifier.

This offers the advantage that the current acquisition may be conveyed directly to the signal electronics of the transformer, which therefore means that no energy-intensive conversion of the signals has to be carried out.

According to an example embodiment of the present invention, a system includes a rectifier which is able to be supplied from an electrical AC-voltage supply network, a first inverter which feeds a first electric motor, and a second inverter which feeds a second electric motor. The DC-voltage side connection of the first inverter is connected to the DC-voltage side connection of the rectifier, and the DC-voltage side connection of the second inverter is connected to the DC-voltage side connection of the rectifier, in particular, the two DC-voltage side connections of the inverters are switched in parallel. A controller unit is provided, in particular in the first inverter, which controls the power accepted from the AC-voltage supply network, in particular via the rectifier, toward a setpoint value by setting the torque of the electric motor fed by the first inverter, the controller unit particularly having a feed-forward path so that the power output or accepted by the second electric motor via the second inverter is effective as the feed-forward signal, or which controls the acquired current that emerges at the DC-voltage side connection of the rectifier toward a setpoint value in that the torque of the electric motor fed by the first inverter is the controlled variable, and the setpoint value is a measure of the power accepted from the network and is constant, in particular.

This offers the advantage that as little power as possible is withdrawn from the AC-voltage supply network. Thus, in an operation of the second electric motor during which a constant switch takes place between a generator mode and a motor mode, the first drive is used as a flywheel energy store, which therefore means that less power is received from the AC-voltage supply network via the rectifier.

In example embodiments, a current acquisition device adapted to acquire the current that emerges at the DC-voltage side connection of the rectifier determines a value I_ZK_N and this value is conveyed to a product generation device, which multiplies the value by the acquired value of voltage U_ZK_actual applied at the DC-voltage side connection of the rectifier. This is considered advantageous insofar as it is easy to determine the power withdrawn from the AC-voltage supply network.

In example embodiments, the controller unit includes a linear controller and the feed-forward path, the difference between the acquired or determined power accepted from the AC-voltage supply network, in particular the power accepted via the rectifier, and a setpoint value of the power received from the AC-voltage supply network is conveyed to the controller as the input signal, the feed-forward signal is added to the output signal of the linear controller and a signal that corresponds to a power loss of the first electric motor is added to the sum signal generated in this manner, and the thereby generated signal is conveyed to a division device, which supplies the signal that is divided by a signal corresponding to the rotational frequency of the first electric motor as the output signal, the output signal is used as the controlled variable and corresponds to the torque of the electric motor fed by the first inverter. This has the advantage that a rapid adjustment control is achievable with the aid of the feed-forward control. In addition, a rapid adjustment control is also achievable by considering the power loss of the first motor. The torque as the controlled variable is easily determined with the aid of the division by the angular velocity of the motor, in particular the rotational frequency.

In example embodiments, the linear controller is a PI controller. This is considered advantageous insofar as a simple configuration of the controller is able to be provided.

In example embodiments, the signal corresponding to the rotational frequency of the first electric motor is acquired with the aid of a sensor for sensing the rotational frequency or position, which is disposed on the first electric motor, or it is determined on the basis of the acquired value of the motor current of the first electric motor and on the basis of the value of the acquired motor voltage or the voltage acquired at the DC-voltage side connection of the rectifier, in particular with the aid of a machine model. This offers the advantage that the acquired rotational frequency may be used for the most current and accurate determination of the controlled variable.

In example embodiments, the power accepted by the second electric motor via the second inverter is formed by the voltage acquired at the DC-voltage side connection of the rectifier and the current accepted and acquired by the second inverter. This is considered advantageous insofar as the power of the second motor is easily determined.

In example embodiments, the power accepted by the first electric motor via the first inverter is formed by the voltage acquired at the DC-voltage side connection of the rectifier and the current accepted and acquired by the first inverter. This has the advantage that the power of the first motor is easily determined.

According to an example embodiment of the present invention, a method for operating a system that includes a rectifier which is able to be supplied from an electrical AC-voltage supply network, a first inverter which feeds a first electric motor, and a second inverter which feeds a second electric motor, in particular, the system is arranged in the afore-described manner, the DC-voltage side connection of the first inverter is connected to the DC-voltage side connection of the rectifier, the DC-voltage side connection of the second inverter is connected to the DC-voltage side connection of the rectifier, in particular, the two DC-voltage side connections of the inverters are switched in parallel, in particular, a controller unit is provided, in particular in the first inverter, and the power accepted from the AC-voltage supply network, in particular via the rectifier, is controlled towards a setpoint value by setting the torque of the electric motor supplied by the first inverter, and the power output or accepted by the second electric motor via the second inverter is effective as the feed-forward signal.

This offers the advantage that the power withdrawn from the AC-voltage supply network is easily able to be reduced to the smallest value possible.

In example embodiments, the first electric motor is developed as a fan motor, and the flow of cool air supplied by the fan motor is guided along the second electric motor and/or the second inverter and/or conducted through the second electric motor, or in other words, a fan is particularly connected to the rotor shaft of the first electric motor in a torsionally fixed manner. This offers the advantage that the fan may be used as a flywheel mass. Thus, the fan motor is able to be operated as a flywheel energy store.

In example embodiments, when the second electric motor is operated in a generator mode, the flow of cool air increases and thus becomes greater, in particular. This offers the advantage that it is possible to supply power to the flywheel energy store in a generator-mode operation, meaning that the flywheel energy store arranged as a fan motor accepts more energy. Due to the higher rotational frequency, a stronger airflow is therefore generated and the second inverter and/or the second electric motor is/are cooled more heavily.

In example embodiments, a difference generation device determines the setpoint value (I_ZK_SMS_setpoint) by generating the difference between a constant value (const) and the acquired value (I_ZK_App) of the current accepted by the second inverter at its direct current side connection. This offers the advantage that the constant value corresponds to the current withdrawal from the AC-voltage supply network. Thus, the excess current is withdrawn from the flywheel energy store or supplied to it.

In example embodiments, the constant value (const) is as small as possible, in particular in the range that is averaged over an extended period of time. This is considered advantageous insofar as a minimal current withdrawal from the AC-voltage supply network over the longest period of time possible may be achieved. The duration of the time period depends on the energy capacity limits of the flywheel energy store. For example, a further energy withdrawal from a discharged energy store, i.e. flywheel energy store, is unable to take place. In the same manner, given a maximally permissible charge, a further supply of power to the energy store is no longer allowed.

In example embodiments, the housing of the first inverter also surrounds the second inverter in a housing-forming manner. This is considered advantageous insofar as the most compact configuration possible is achievable. In addition, a single signal electronics, for example, is sufficient for both inverters.

In example embodiments, a signal electronics generates the control signals for the power semiconductor switches of the first inverter disposed in half-bridges and generates the control signals for the power semiconductor switches of the second inverter disposed in half-bridges. This is considered advantageous insofar as a data bus is omitted and a single signal electronics thus generates the control signals of both inverters.

In example embodiments, a signal electronics of the first inverter is connected to the signal electronics of the second inverter with the aid of a data bus for a data exchange. This is considered advantageous insofar as the two signal electronics of the two inverters are able to be operated in a synchronized manner with the aid of the data bus. The two inverters may be placed in separate housings.

In example embodiments, a difference formation device determines a controller input value by generating the difference between a constant value (I_ZK_N_setpoint) and the value (I_ZK_N), acquired by the first inverter, of the entire current supplied by the rectifier to the intermediate circuit. The controller which adjusts this difference has the setpoint torque of the first motor as the controlled variable. This offers the advantage that the constant value corresponds to the current withdrawal from the AC-voltage supply network, and the excess current is therefore withdrawn from the flywheel energy store or supplied thereto.

In example embodiments, the constant value (I_ZK_N_setpoint) is as low as possible, in particular in the range that is averaged across an extended period of time. This has the advantage that the longest possible minimal current withdrawal from the AC-voltage supply network is achievable. The duration of the period depends on the energy capacity limits of the flywheel energy store. For example, a further energy withdrawal from a discharged energy store, i.e. flywheel energy store, is unable to take place. In the same manner, with a maximally permitted charge, a further supply of power to the energy store is no longer allowed. In the standard case, the minimal current withdrawal, and thus a minimal power acceptance from the network, is achieved on a continuous basis.

In example embodiments, a further measuring device is provided, which acquires the current of the second inverter. (I_ZK_App). This offers the advantage that it is possible to determine the power of the second inverter required for the feed-forward control with the aid of the acquired current of the second inverter, this being done by multiplying the current of the second inverter by the measured intermediate circuit voltage U_ZK_actual. In the case of more than one application inverter, I_ZK_App corresponds to the sum current of all application inverters.

Further features and aspects of example embodiments of the present invention are described in greater detail below with reference to the appended Figures.

DETAILED DESCRIPTION

Figure 1:
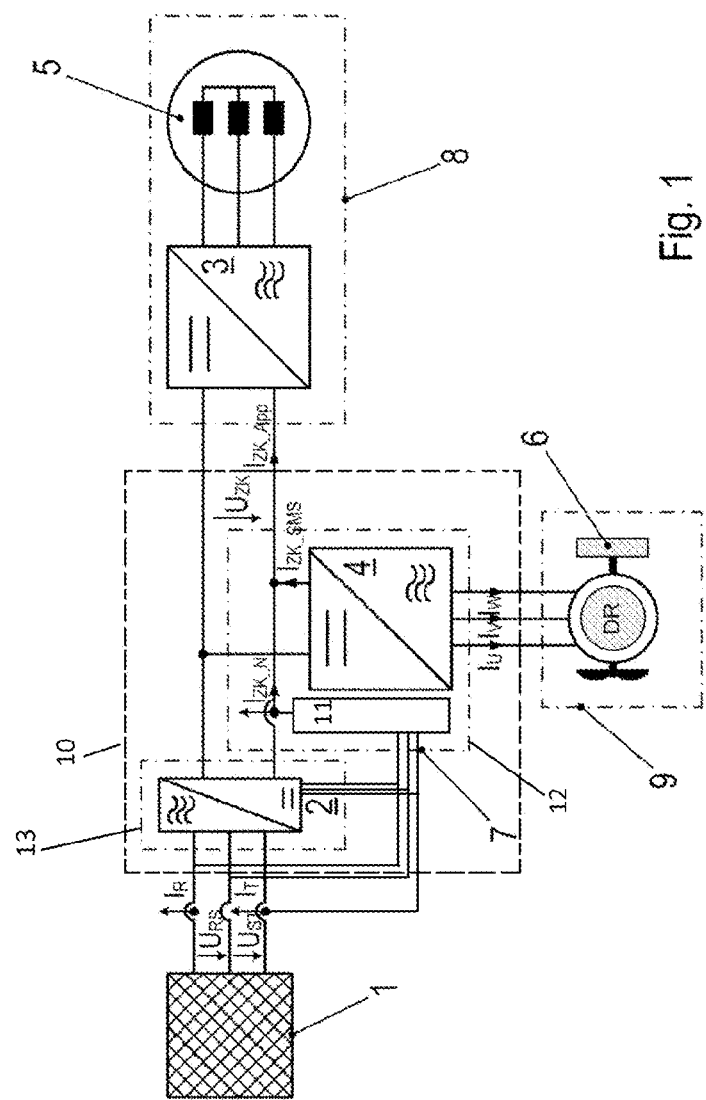
In FIG. 1, a system according to an example embodiment of the present invention is shown.

As illustrated in FIG. 1, a rectifier 2, at whose DC-voltage side output two inverters (3, 4) are connected which are switched in parallel, is supplied from an AC-voltage supply network 1.

The DC-voltage side output of rectifier 2, i.e. the intermediate circuit, has voltage U_ZK.

Current I_ZK_N emerging or entering at the DC-voltage side connection of rectifier 2 is acquired. The current withdrawn by second inverter 3 is denoted by I_ZK_App, and the current withdrawn by first inverter 4 is correspondingly denoted by I_ZK_SMS.

The current acquisition device, i.e. for acquiring current I_ZK_N, is disposed inside the housing of first inverter 4. The acquired current values are thus conveyed to the signal electronics of the first inverter without long lines, i.e. directly.

As an alternative, current I_ZK_N may also be determined from the currents, in particular phase currents ($I_R$, $I_S$, $I_T$), of the AC-voltage supply network acquired at the AC-voltage side connection of rectifier 2. This requires at least two acquired phase-current values ($I_R$, $I_T$). The phase-current acquisition device, i.e. for the acquisition of the phase currents ($I_R$, $I_S$, $I_T$), is located inside the housing of first inverter 4. Thus, the acquired current values are conveyed to the signal electronics of the first inverter without long lines, i.e. directly.

As illustrated in FIG. 1, second inverter 3 feeds a three-phase motor 5, which is connected to an AC-voltage side output of second inverter 3. Second inverter 3 has a power output stage made up of three half-bridges, and a power semiconductor switch, in particular an IGBT or a MOSFET, is disposed in each upper and lower branch of each half-bridge. The power semiconductor switches of this power output stage of inverter 3 are controlled with the aid of pulse-width-modulated signals in each case, these signals being generated by a signal electronics of second inverter 3. The signals from the signal electronics of second inverter 3 are generated such that the motor current is controlled toward a predefined setpoint value via the motor voltage set by second inverter 3. A setpoint value for torque corresponds to the setpoint value of the motor current. Alternatively, it is also possible to control toward a setpoint value for the rotational frequency.

Intermediate circuit voltage U_ZK is also applied at the DC-voltage side connection of first inverter 4, which supplies an electric motor of a flywheel energy store. The electric motor may be arranged as a three-phase motor whose motor phase currents are denoted by I_U, I_V and I_W. The three-phase motor may be arranged as an asynchronous motor. The flywheel mass may be arranged a fan which is connected to the rotor of the electric motor in a torsionally fixed manner so that the fan motor functions as a flywheel energy store.

In other words, the electric motor has a rotor shaft which is connected in a torsionally fixed manner to the rotatably mounted flywheel mass 6, which may be arranged in the form of a fan, so that, in the motor operation of the motor, energy is able to be stored in the flywheel energy store from the direction of the electric motor and withdrawn in a generator-mode operation.

First inverter 4 thus feeds a three-phase motor which is connected to the AC-voltage side output of first inverter 4. First inverter 4 also has a power output stage which is made up of three half-bridges, and a power semiconductor switch, in particular an IGBT or MOSFET, is disposed in each upper and lower branch of each half-bridge. The power semiconductor switches of this power output stage of first inverter 4 are controlled with the aid of pulse-width-modulated signals, which are generated by a signal electronics of first inverter 4. The signals electronics of first inverter 4 generates the signals such that the motor current is controlled toward a predefined setpoint value through the motor voltage set by first inverter 4. A setpoint value for torque corresponds to the setpoint value of the motor current. Alternatively, it is also possible to control toward a setpoint value characteristic of the rotational frequency.

As illustrated in FIG. 1, the rectifier 2 may be enclosed and/or surrounded by a housing 10 of the first inverter 4 in a housing-forming manner.

Thus, according to an example embodiment of the present invention, as illustrated in FIG. 1, for example, a system includes: a rectifier 2 adapted to be supplied from an electrical AC-voltage supply network 1; a first inverter 4 adapted to feed a first electric motor; a second inverter 3 adapted feed a second electric motor 5; and a current-acquisition device 11 arranged inside a housing 12 of the first inverter 4. DC-voltage side connections of the first and the second inverter 4, 3 are connected to a DC-voltage side connection of the rectifier 2. The current-acquisition device 11 is adapted to acquire current emerging from the rectifier 2 at the DC-voltage side connection of the rectifier 2 and/or to acquire currents entering from the electrical AC-voltage supply network 1 at an AC-voltage side connection of the rectifier. The housing 12 of the first inverter 4 is adapted for supply from a network-side three-phase current, to convey the network-side three-phase current to the current acquisition device 11, and/or to route the network-side three-phase current out of the housing 12 of the first inverter 4 to a housing 13 of the rectifier 2.

Figure 2:
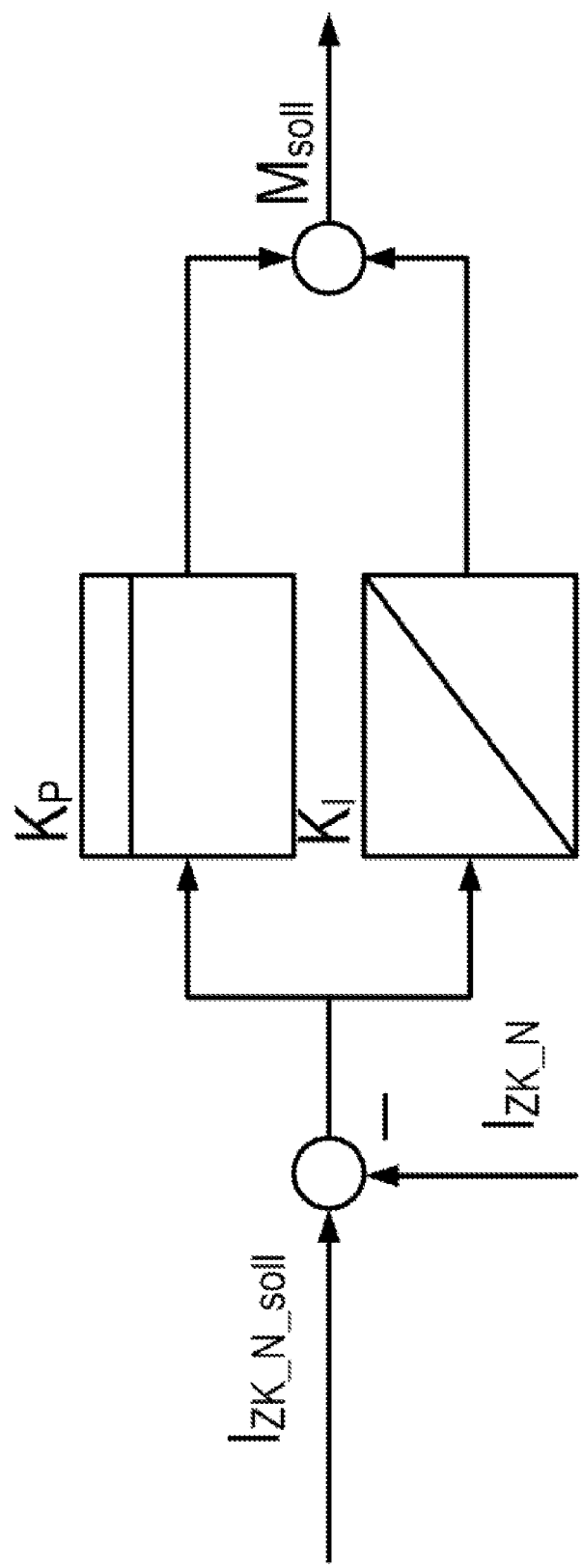
In FIG. 2, a control method used in the system is schematically illustrated.

According to example embodiments of the present invention, the control method shown in FIG. 2 is applied.

For this purpose, current I_ZK_N emerging at the DC-voltage side connection of rectifier 2 is acquired and controlled toward a setpoint value I_ZK_N_setpoint by setting the torque of motor DR of flywheel energy store 9.

As an alternative, instead of acquiring current I_ZK_N, current I_ZK_SMS entering or emerging at the DC-voltage side connection of the first inverter is acquired, and the current I_ZK_App entering or emerging at the DC-voltage side connection of the second inverter is acquired. Using these two acquired values, it is possible to determine current I_ZK_N with the aid of a summing operation.

Due to the control schematically illustrated in FIG. 2, the current supplied by rectifier 2, i.e. by the AC-voltage supply network, does not exceed a constant value const, or at least does not exceed it on a continuous basis. This is because current I_ZK_SMS accepted or output by flywheel energy store 9 is correspondingly controlled in an indirect manner.

As illustrated in FIG. 2, the difference between setpoint value I_ZK_N_setpoint and actual value I_ZK_N actual is forwarded to the controller. The controller is implemented as a linear controller, in particular as a PI controller whose controlled variable is the setpoint value of torque M_setpoint of electric motor DR of flywheel energy store 9 fed by inverter 4. Thus, electric motor DR of flywheel energy store 9 is accelerated or decelerated such that the sum of its own load value and the transmitted load value of second drive 8, in particular of electric motor 5, has a constant value, in particular the smallest value possible, or is at least controlled toward such a value.

As a result, the current withdrawal from rectifier 2 induced by electric motor 5 via inverter 3 is able to be restricted in that flywheel energy store 9 supplies a corresponding current component.

As illustrated in FIG. 1, a fan is mounted in a torsionally fixed manner on the rotor connected to flywheel mass 6, i.e. in particular also connected to the rotor in a torsionally fixed manner. In this manner, the airflow supplied by the fan is used for cooling drive 8, in particular of motor 5 and/or inverter 3 which supply or supplies it.

As an alternative, flywheel mass 6 is able to be obtained through a corresponding mass-rich configuration of the fan. As a result, a fan driven by a motor is able to be operated as a flywheel energy store. The use of the control shown in FIG. 2 in such a fan motor may also be utilized when the maximum power of drive 8 is less than the power maximally able to be accepted or output by the fan motor.

Alternatively, the network power may be determined either approximately by multiplying I_ZK_N by the intermediate circuit voltage U_ZK, or directly by measuring the three phase currents and the three phase voltages. Because the characteristic of the feeding network (symmetry, root-mean-square value of the voltage) is known, fewer than the mentioned six phase variables may also be sufficient for determining the network power. If the network power is known, then it is able to be controlled to a minimum.

Figure 3:
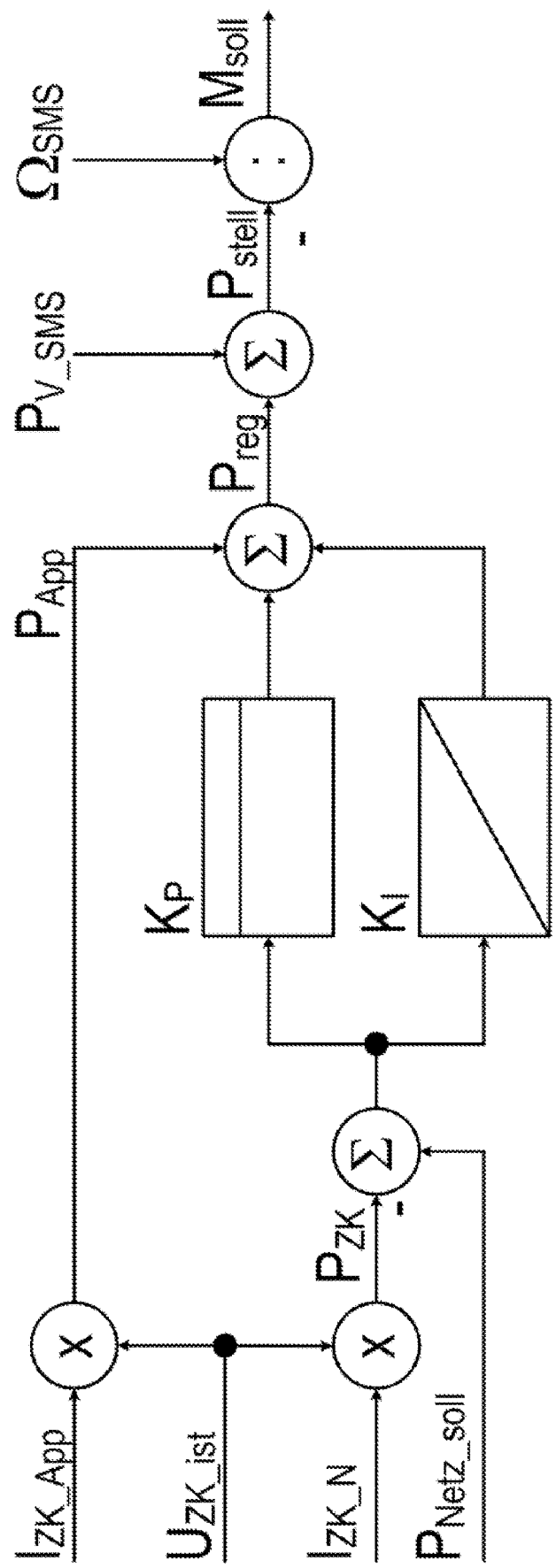
In FIG. 3, a further control method is schematically illustrated.

As illustrated in FIG. 3, the actual value of power P_ZK introduced into the intermediate circuit from the AC-voltage supply network via rectifier 2 is determined in that the product of the actual value U_ZK_actual of the intermediate circuit voltage, acquired using a corresponding voltage-acquisition device, and the actual value of current I_ZK_N, acquired or determined from I_ZK_App and I_ZK_SMS. Alternatively, the network power may be determined either approximately by multiplying I_Z_K_N by intermediate circuit voltage U_ZK, or directly by measuring the three phase currents and the three phase voltages. Because the characteristic of the feeding network (symmetry, root-mean-square value of the voltage) is known, fewer than the mentioned six phase variables may also be sufficient for determining the network power. If the network power is known, it is able to be controlled to a minimum.

This power P_ZK is controlled toward a setpoint value P_ZK_setpoint by forwarding the difference between P_ZK and P_ZK_setpoint to a controller, in particular to a linear controller, the controller generating a controlled value to which the power P_App accepted by the second inverter 3, and thus particularly also by second motor 5, is added as a feed-forward value, the result of this summation being denoted by P_reg.

P_App is determined as the product of the acquired actual value U_ZK_actual and the actual value of current I_ZK_App accepted by the second inverter at its direct-current side connection.

In addition, a value P_V_SMS is added to determined value P_reg so that a controlled value P control is determined, in which power loss P_V_SMS of the flywheel energy store has been taken into account.

Dividing controlled value P_control by the rotational frequency Ω_SMS, i.e. in particular the angular velocity, of the rotor of the electric motor of the flywheel energy store makes it possible to determine controlled value M_setpoint therefrom, i.e. the desired torque of electric motor DR of the flywheel energy store.

Thus, it is important that a linear controller controls the power of the drive of the flywheel energy store toward a setpoint value by setting the torque of the drive of the flywheel energy store appropriately, for which the power accepted by the second inverter is used as the feed-forward value.

In a generator-mode operation, three-phase motor 5 is cooled more heavily, or especially heavily, by flywheel energy store 9 functioning as a fan because power is discharged to flywheel energy store 9, which means that its rotational frequency increases.

If the current acquisition device for acquiring the current entering at the DC-voltage side connection of the rectifier is situated in the housing of first inverter 4, i.e. in particular the device for acquiring the phase currents, then a supply of the network-side three-phase current at the housing of the first inverter is possible, which is supplied to the current acquisition device and is routed out of there to the housing of the rectifier. In addition, the DC-voltage side connection of rectifier 2 is connected to a corresponding DC-voltage side connection, i.e. the intermediate circuit connection, of first inverter 4. Moreover, the first motor is electrically connected to the DC-voltage side connection of first inverter 4, in particular with the aid of a three-phase cable.

In example embodiments, the signal electronics of second inverter 3 is connected to the signal electronics of first inverter 4 for a data exchange with the aid of a field bus.

LIST OF REFERENCE CHARACTERS

1 AC-voltage supply network
2 rectifier
3 inverter of second drive 8
4 inverter of first drive 7
5 three-phase motor
6 flywheel mass
7 first converter, in particular an inverter
8 first drive
9 flywheel energy store
10 housing
11 current-acquisition device
12 housing of first inverter
13 housing of rectifier
CPU signal electronics including processing unit
DR three-phase motor, in particular an asynchronous motor
U_ZK intermediate circuit voltage
U_ZK_Ist acquired actual value of the intermediate circuit voltage
P_Netz_Soll setpoint value of the power received from the AC-voltage supply network
P_ZK power received from the AC-voltage supply network
P_App power of the second drive
P_reg idealized controlled value of the power
P_V_SMS power loss of the flywheel energy store, especially power loss as a function of the rotational frequency
P_Stell controlled value of the power of the first drive
Ω_SMS rotational frequency of the rotor of the electric motor of the flywheel energy store
I_ZK_N current transmitted from rectifier 2 to the intermediate circuit
I_ZK_N_Soll setpoint value for current I_ZK_N
I_ZK_App actual value of the input current of inverter 3
I_ZK_SMS actual value of the input current of inverter 4

I_ZK_SMS_Soll setpoint value of the input current of inverter 4
I_U first phase current of motor DR
I_V second phase current of motor DR
I_W third phase current of motor DR
M_Soll torque setpoint value
Const setpoint current, in particular setpoint current accepted by rectifier 2 into the intermediate circuit
K_P proportionality component
K_I integral component

The invention claimed is:

1. A system, comprising:
a rectifier adapted to be supplied from an electrical AC-voltage supply network;
a first inverter adapted to feed a first electric motor;
a second inverter adapted feed a second electric motor; and
a current-acquisition device arranged inside a housing of the first inverter;
wherein DC-voltage side connections of the first and the second inverter are connected to a DC-voltage side connection of the rectifier;
wherein the current-acquisition device is adapted to acquire current emerging from the rectifier at the DC-voltage side connection of the rectifier and/or to acquire currents entering from the electrical AC-voltage supply network at an AC-voltage side connection of the rectifier, and
wherein the housing of the first inverter is adapted for supply from a network-side three-phase current, to convey the network-side three-phase current to the current acquisition device, and/or to route the network-side three-phase current out of the housing of the first inverter to a housing of the rectifier.

2. A system, comprising:
a rectifier adapted to be supplied from an electrical AC-voltage supply network;
a first inverter adapted to feed a first electric motor;
a controller unit provided in the first inverter; and
a second inverter adapted to feed a second electric motor;
wherein a DC-voltage side connection of the first inverter is connected to a DC-voltage side connection of the rectifier, a DC-voltage side connection of the second inverter is connected to the DC-voltage side connection of the rectifier, the DC-voltage side connections of the inverters being switched in parallel;
wherein the controller unit is: (a) adapted to control power accepted from the AC-voltage supply network, via the rectifier, toward a setpoint value by setting a torque of the first electric motor, the controller unit including a feed-forward path so that power output or accepted by the second electric motor via the second inverter becomes effective as a feed-forward signal, and/or (b) adapted to control an acquired current emerging at the DC-voltage side connection of the rectifier toward a setpoint value in that the torque of the first electric motor is a controlled variable, and the setpoint value is a measure of power accepted from the network and being constant.

3. The system according to claim 2, wherein a current acquisition device adapted to acquire current emerging at the DC-voltage side connection of the rectifier is adapted to determine a value and to convey the value to a product generation device adapted to multiply the value by an acquired value of the voltage applied at the DC-voltage side connection of the rectifier.

4. The system according to claim 2, wherein the setpoint value is as low as possible and/or is as low as possible in a range that is averaged over an extended period of time.

5. The system according to claim 2, wherein the rectifier is arranged as a structural part of the first inverter, and the rectifier is enclosed and/or surrounded by a housing of the first inverter in a housing-forming manner.

6. The system according to claim 2, wherein the controller unit has a linear controller and the feed-forward path, a difference between acquired or determined power accepted from the AC-voltage supply network and/or power accepted via the rectifier, and a setpoint value of the power received from the AC voltage-supply network is conveyed to the linear controller as an input signal, and the feed-forward signal is added to an output signal of the linear controller and a signal that corresponds to a power loss of the first electric motor is added to a sum signal generated in this manner, and the thereby generated signal is conveyed to a division device adapted to supply the thereby formed signal divided by a signal corresponding to a rotational frequency of the first electric motor as an output signal adapted for use as a controlled variable and corresponding to a torque of the first electric motor.

7. The system according to claim 6, wherein the linear controller includes a PI controller.

8. The system according to claim 6, wherein the signal corresponding to the rotational frequency of the first electric motor is acquired with the aid of a sensor provided on the first electric motor, and/or is determined from an acquired value of a motor current of the first electric motor and from value of an acquired motor voltage or a voltage acquired at the DC-voltage side connection of the rectifier, with the aid of a machine model.

9. The system according to claim 2, wherein power accepted by the second electric motor via the second inverter is formed by a voltage acquired at the DC-voltage side connection of the rectifier and a current accepted and acquired by the second inverter.

10. The system according to claim 2, wherein power accepted by the first electric motor via the first inverter is formed by a voltage acquired at the DC-voltage side connection of the rectifier and current accepted and acquired by the first inverter.

11. The system according to claim 2, wherein the first electric motor is arranged as a fan motor adapted to supply a flow of cool air that is conveyed along the second electric motor and/or the second inverter and/or through the second electric motor.

12. The system according to claim 11, wherein a fan is connected in a torsionally fixed manner to a rotor shaft of the first electric motor.

13. The system according to claim 11, wherein in a generator-mode operation of the second electric motor, the flow of cool air increases, and thus becomes larger.

14. The system according to claim 2, wherein signal electronics are adapted to generate control signals for power semiconductor switches of the first inverter disposed in half-bridges and to generate control signals for power semiconductor switches of the second inverter disposed in half-bridges.

15. The system according to claim 2, wherein signal electronics of the first inverter are connected via a data bus to signal electronics of the second inverter for a data exchange.

16. A method for operating a system that includes a rectifier adapted to be supplied from an electrical AC-voltage supply network, a first inverter adapted to feed a first electric motor and including a controller unit, and a second inverter adapted to feed a second electric motor, a DC-voltage side connection of the first inverter being connected to a DC-voltage side connection of the rectifier, a DC-voltage side connection of the second inverter being connected to the DC-voltage side connection of the rectifier, the DC-voltage side connections of the inverters being switched in parallel, comprising:

controlling power accepted from the AC-voltage supply network, via the rectifier, toward a setpoint value by setting a torque of the first electric motor, power output and/or accepted by the second electric motor via the second inverter being effective as a feed-forward signal.

* * * * *